United States Patent [19]

Keenan

[11] 4,021,773
[45] May 3, 1977

[54] ACOUSTICAL PICK-UP FOR RECEPTION OF SIGNALS FROM A DRILL PIPE

[75] Inventor: Bernard J. Keenan, West Chester, Pa.

[73] Assignee: Sun Oil Company of Pennsylvania, Philadelphia, Pa.

[22] Filed: Oct. 29, 1974

[21] Appl. No.: 518,922

[52] U.S. Cl. .................... 340/18 LD; 73/40.5 A; 340/8 S

[51] Int. Cl.² .......................................... G01V 1/40

[58] Field of Search ....... 73/40.5 A, 71.4, 71.5 US; 340/8 S, 18 NC, 18 LD; 128/2.05 S, 2.05 Z, 2.05 V, 2.05 P

[56] References Cited

UNITED STATES PATENTS

| | | | |
|---|---|---|---|
| 2,810,546 | 10/1957 | Eaton et al. | 340/18 LD |
| 3,205,477 | 9/1965 | Kalbfell | 340/18 NC |
| 3,283,181 | 11/1966 | Johanson | 128/2.05 S |
| 3,486,375 | 12/1969 | Redwine et al. | 73/71.4 |
| 3,588,804 | 6/1971 | Fort | 340/18 LD |
| 3,732,728 | 5/1973 | Fitzpatrick | 340/18 NC |
| 3,742,937 | 7/1973 | Manuel et al. | 128/2.05 P |
| 3,789,355 | 1/1974 | Patton | 340/18 NC |
| 3,900,827 | 8/1975 | Lamel et al. | 340/18 NC |

Primary Examiner—Howard A. Birmiel
Attorney, Agent, or Firm—J. Edward Hess; Donald R. Johnson; William C. Roch

[57] ABSTRACT

An acoustical pick-up apparatus for use with a borehole acoustical telemetry system and which may be positioned on a drilling rig at a number of locations above the drill pipe, includes an electro-acoustical transducer coupled to a pick-up block having an arcuate contact face to conform to a cylindrical member on the drilling rig and a strap connected to the contact face at points spaced from the edge thereof.

12 Claims, 4 Drawing Figures

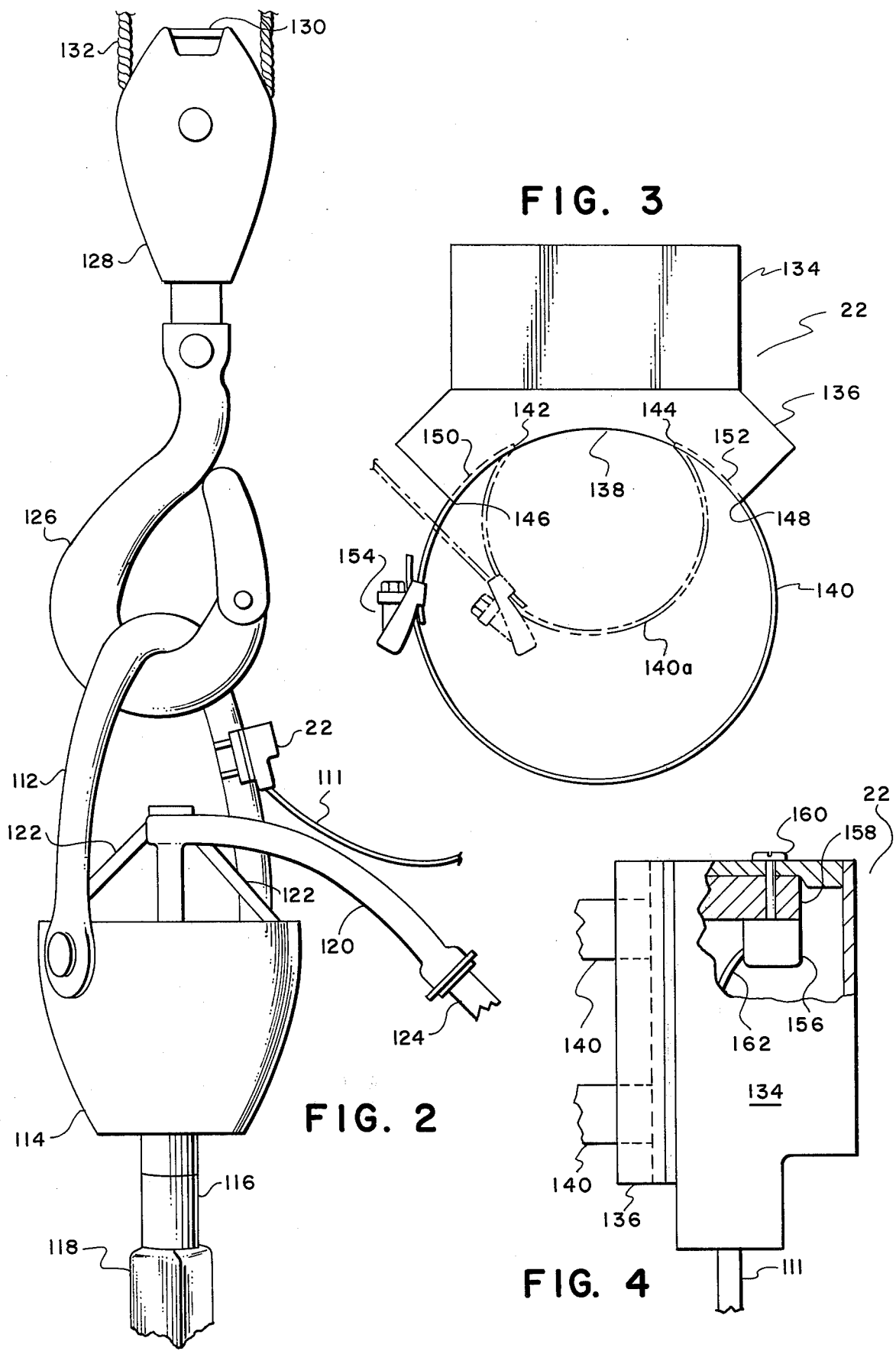

ACOUSTICAL PICK-UP FOR RECEPTION OF SIGNALS FROM A DRILL PIPE

BACKGROUND OF THE INVENTION

The invention relates to receiving signals from a transmission medium, and more particularly to receiving acoustical signals from a borehole drilling apparatus.

Transmission of signals in a medium such as a drill pipe by means of acoustical energy has been found to be a convenient way of monitoring parameters in a borehole. Acoustical telemetry systems have been recently disclosed by Elbert N. Shawhan in his U.S. patent applications entitled "Telemetering Systems for Boreholes" bearing Ser. No. 390,833 and filed Aug. 23, 1973; and "Two-Way Acoustical Telemetering System" bearing Ser. No. 416,467, filed Nov. 16, 1973. These and other systems in which signals are sent through a solid medium by means of acoustical energy require appropriately located means for receiving the signals from the medium.

In the borehole systems it is preferable that the signal be extracted from the transmission medium at a point in the drilling apparatus or rig that will not interfere with drilling operations. It has been proposed that the signal be picked off at the upper end of the drill pipe. However, this would present several serious problems. First, in a rotary drilling system some means of connecting a conductor line to the rotating pick-up apparatus must be found if telemetry is desired while drilling is occurring. Second, if such a connector is not found, drilling must be stopped to perform telemetry, thereby wasting costly drilling time. Third, in either the above two situations the pick-up must be periodically attached and removed, which consumes further drilling time. In drilling operations conducted with a turbine-driven drill, in which the drill pipe does not rotate, the drilling operation is hampered primarily by attachment and removal of the pick-up. Attachment of the pick-up to the drill pipe is therefore unsatisfactory, and another location for the pick-up is desirable.

Among the possible locations for the pick-up in a drilling apparatus, some of the more convenient are generally pipes or other cylindrical members. A pick-up for use on such cylindrical members should provide good acoustical coupling. Welded coupling devices have been proposed, but they do not provide the flexibility of placement that is desirable. Non-welded coupling devices that have been proposed for such members generally include a block having an arcuate face to mate with the cylindrical surface and a flexible strap which wraps around both the block and the cylindrical member to secure the two together. A pick-up of this design, however, provides in some cases a poor medium for passage of precise acoustical signals due to the position of the strap. Unless the block precisely mates with the cylindrical member and its lateral edge is perfectly tangent to the cylindrical surface, there is a gap over which the strap must pass between the block and the cylindrical surface. The strap is thus not in intimate contact with the solid surface in this area and is free to vibrate. Vibration introduces undesirable resonance into the pick-up apparatus, which distorts the signal.

The desired mode of contact is not generally possible due to variations in size and shape of cylindrical members to which the block may be attached. For example, the block may fit a new piece of drill pipe within limits of tolerance. However, as the pipe ages, it may wear down to a slightly smaller size and become bent and misshapen, thereby precluding the desired mode of contact. The wrap-around strap design is therefore unsatisfactory in such situations, and a pickup whose reception characteristics are not altered by variations in drill pipes, or either cylindrical members, is desirable.

SUMMARY OF THE INVENTION

The apparatus embodying the invention provides a novel acoustical pickup which is positioned above the drill pipe in a drilling apparatus.

The pickup includes a contact block having an arcuate contact face, a strap conformable to the face and connected thereto at points spaced from the edge of the face, and an electrical acoustical transducer on the block.

BRIEF DESCRIPTION OF THE DRAWINGS

The invention may be better understood by considering the exemplary embodiments illustrated in the following drawings:

FIG. 2 shows a swivel, hook and traveling block assembly from a drilling rig;

FIG. 3 is a top view of the pick-up; and

FIG. 4 is a side view of the pick-up.

DESCRIPTION OF THE PREFERRED EMBODIMENTS

Figure 1:
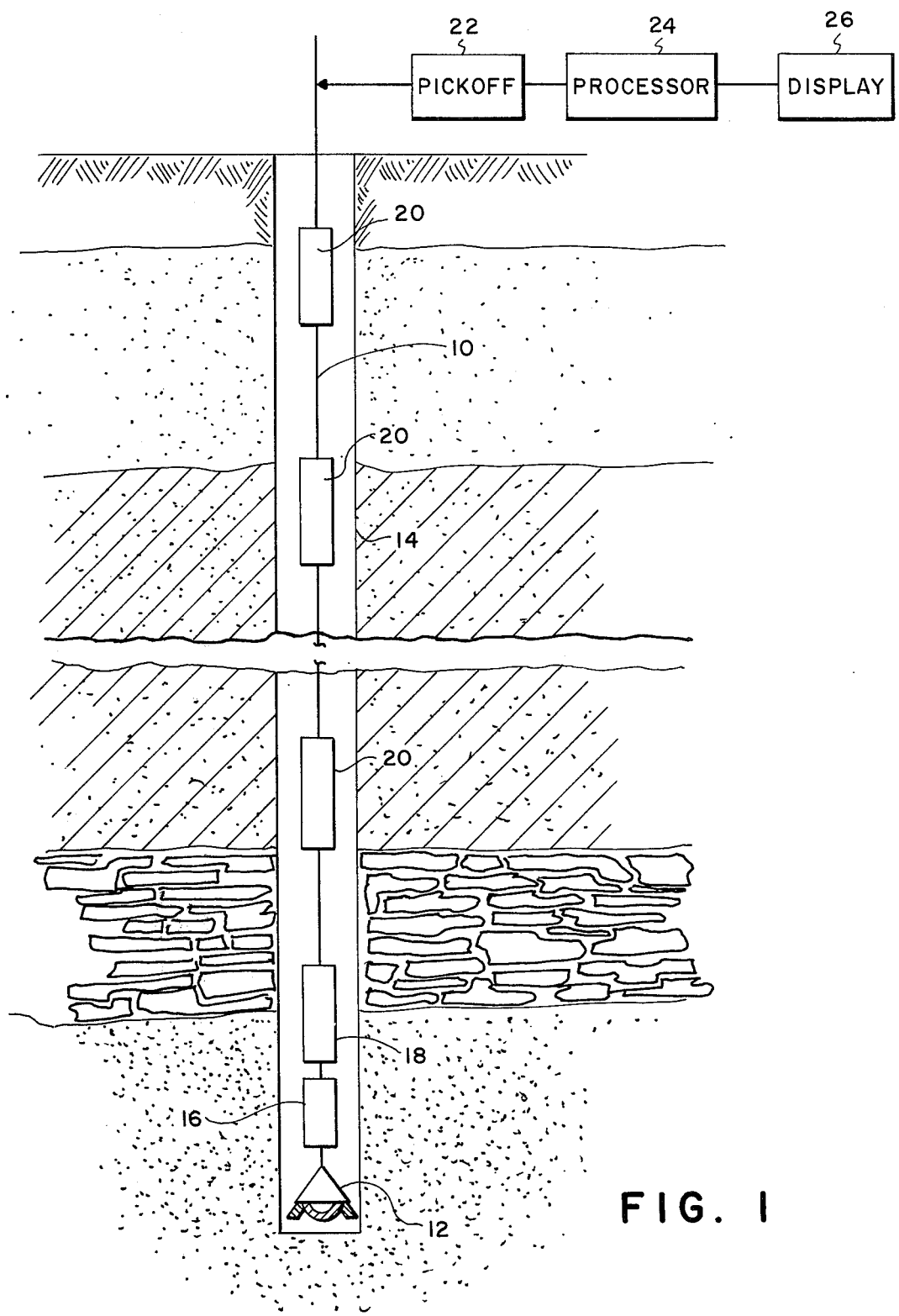
FIG. 1 shows a borehole acoustical telemetry system in which the invention may be used.

The invention may be used in conjunction with a borehole signalling system like the acoustical telemetry system schematically represented in FIG. 1. The system uses as a transmission medium a drill pipe 10, which has on its lower end of a drill bit 12. Signals relating to borehole parameters may be produced by a generator 16 and then coupled into drill pipe 10 by a transmitter 18. As the signals travel along the drill pipe, they may become attenuated and need to be amplified as by repeater 20 spaced along drill pipe 10. At the surface the signals may be removed by a pick-off apparatus 22, which may send them by electrical cable, radio transmitter, or the like, to a processor 24 and a display unit 26.

FIG. 2 shows pick-up 22 positioned above the drill pipe on a bail 112 which supports a swivel 114. Pick-up 22 communicates with readout equipment, or the like, by means of an electrical cable 111. Communication may also be had by a radio transmitter, or the like. Swivel 114 includes a freely rotatable drill stem coupling 116 which is connected to a kelly 118. The kelly is a square member that provides a gripping surface for turning the drill pipe, which is connected to the lower end of the kelly. On the top of the swivel 114 is a gooseneck assembly 120 supported by braces 122. Gooseneck 120, which provides a conduit through which drilling mud flows to the drill pipe, is connected to a mud hose 124.

Bail 112 is supported by hook 126 which is attached to a traveling block 128. Block 128, which has a lifting eye 130, is raised and lowered by cable assembly 132.

The assembly of FIG. 2 has been found to provide in several locations appropriate acoustical coupling to the drill pipe. Although the assembly of FIG. 2 is not solidly connected together, the downward pull caused by the large weight of the drill pipe provides the intimate connection that is desirable. The acoustical signals are thus appropriately coupled through swivel 114 and into bail 112, where pick-up 22 is shown positioned in FIG. 2. The signals are also coupled to gooseneck 120 where the pick-up may also be positioned. In addition, the signals are coupled through hook 126 and into traveling block 128, where they may be picked-off the lifting eye 130, or the like.

Pick-up 22 is shown in greater detail in FIG. 3. It includes a transducer housing 134 which is solidly connected, as by bronze brazing, to contact block 136. The contact block has an arcuate contact face 138 which is shaped to abut a cylindrical member, such as bail 112 in FIG. 2. Contact block 136 has attached to it straps 140, such as hose straps, at points 142 and 144, which are spaced from the edges 146 and 148 of block 136. Although any number of straps may be used, only two, one above the other, are used in this embodiment (see FIG. 4). Block 136 has grooves 150 and 152 into which strap 140 may be positioned in order that it will not protrude above contact face 138. The diameter which strap 140 will encompass may be varied by adjusting the position of a clamp 154. This is illustrated by the dotted outline 140a of strap 140. Attachment of strap 140 at points 142 and 144 within the curvature of contact face 138 allows the diameter of the strap to be varied between a maximum and a minimum without the straps losing significant contact with the cylindrical member about which it is positioned. The maximum and minimum diameters are determined by the radius of curvature of contact face 138 and the distance of attachment points 142 and 144 from edges 146 and 148.

FIG. 4 shows a pick-up 22 in a side view with a portion of housing 134 cut away to reveal an electroacoustical transducer 156. The transducer is coupled to a housing 134 through a block 158 by a screw 160. Transducer 156 communicates with associated readout apparatus, or the like, through lead 162 and the cabe 111.

While particular embodiments of the invention have been shown and described, it is obvious that changes and modifications may be made therein without departing from the true scope and spirit of the invention. It is therefore the object in the appended claims to cover all such changes and modifications.

What is claimed is:
1. Acoustical pick-up apparatus comprising:
   a. an electroacoustic transducer;
   b. a contact block for providing efficient acoustic coupling between an object and the electroacoustic transducer, said contact block having an arcuate contact base which curves from a first edge to a second edge;
   c. strap means for securely attaching the electroacoustic transducer to the object and being attached to said arcuate contact base at points spaced from said first and second edges, whereby the attachment of said strap means to points spaced from said first and second edges results in an arrangement wherein the contact block may be efficiently acoustically coupled to many different sized objects while minimizing the length of strap not in intimate contact with the object which is thereby free to vibrate and generate undesirable resonance.
2. Apparatus as set forth in claim 1 wherein said contact block has at least one groove cut in the surface of the arcuate contact base which extends from said first edge to said second edge and which has the same cross sectional shape as said strap means, and said strap means is placed in said at least one groove and does not protrude above the surface of the arcuate contact base between said attachment points.
3. Apparatus as set forth in claim 2 wherein said strap means includes two separate straps and said arcuate contact base has two said grooves formed in it.
4. Apparatus as set forth in claim 3 wherein said strap means includes a clamp means for clamping the ends of said strap means together.
5. Apparatus as set forth in claim 1 wherein said strap means includes two separate straps and said arcuate contact base has two said grooves formed in it.
6. Apparatus as set forth in claim 1 wherein said strap means includes a clamp means for clamping the ends of said strap means together.
7. An acoustic signaling system in a borehole drilling apparatus and comprising:
   a. a drill pipe in the borehole;
   b. acoustic signal generating means in the borehole;
   c. means for coupling the generated acoustic signal into the drill pipe;
   d. acoustic signal pick-up means mounted on a cylindrically shaped part of the drilling apparatus and including an electroacoustic transducer, and means for coupling the electroacoustic transducer to the cylindrically shaped part to provide an efficient acoustic coupling therebetween and including a contact block having an arcuate contact base which curves from a first edge to a second edge and which is adapted to be placed against the cylindrically shaped part and strap means connected to the contact block on the contact base at points spaced from said first and second edges, said strap means extending around the cylindrically shaped part and tightly clamping the contact base against it, whereby the attachment of the strap means at points spaced from said first and second edges results in an arrangement wherein the contact block may be efficiently acoustically coupled to many different cylindrically shaped parts having different diameters while minimizing the length of the strap means which is free to vibrate and generate undesirable resonance.
8. A system as set forth in claim 7 wherein said contact block has at least one groove cut in the surface of the arcuate contact base which extends from said first edge to said second edge and which has the same cross sectional shape as said strap means, and said strap means is placed in said at least one groove and does not protrude above the surface of the arcuate contact base between said attachment points.
9. A system as set forth in claim 8 wherein said strap means includes two separate straps and said arcuate contact base has two said grooves formed in it.
10. A system as set forth in claim 9 wherein said strap means includes a clamp means for clamping the ends of said strap means together.
11. A system as set forth in claim 7 wherein said strap means includes two separate straps and said arcuate contact base has two said grooves formed in it.
12. A system as set forth in claim 7 wherein said strap means includes a clamp means for clamping the ends of said strap means together.

* * * * *